(12) United States Patent
Okita

(10) Patent No.: US 9,204,030 B2
(45) Date of Patent: Dec. 1, 2015

(54) IMAGE PICKUP APPARATUS AND CONTROL METHOD THEREOF

(75) Inventor: Masaki Okita, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 171 days.

(21) Appl. No.: 13/616,636

(22) Filed: Sep. 14, 2012

(65) Prior Publication Data

US 2013/0076972 A1 Mar. 28, 2013

(30) Foreign Application Priority Data

Sep. 22, 2011 (JP) ................................. 2011-206789

(51) Int. Cl.
 *H04N 5/232* (2006.01)
 *G03B 13/36* (2006.01)
(52) U.S. Cl.
 CPC ............ *H04N 5/23212* (2013.01); *G03B 13/36* (2013.01)
(58) Field of Classification Search
 CPC .... H04N 5/23212; H04N 5/343; H04N 5/347
 USPC .................. 348/308, 345, 349, 350
 See application file for complete search history.

(56) References Cited

U.S. PATENT DOCUMENTS

| | | | | |
|---|---|---|---|---|
| 7,041,950 B2* | 5/2006 | Nagano | ...................... | 250/201.2 |
| 8,576,329 B2* | 11/2013 | Takamiya | ...................... | 348/350 |
| 8,890,994 B2* | 11/2014 | Amano | ........................ | 348/345 |
| 2009/0115882 A1* | 5/2009 | Kawarada | ..................... | 348/340 |
| 2011/0249150 A1* | 10/2011 | Shintani et al. | ............ | 348/240.3 |
| 2012/0033115 A1* | 2/2012 | Fujii | .............................. | 348/280 |
| 2013/0076970 A1* | 3/2013 | Kishi | ............................. | 348/349 |
| 2013/0120643 A1* | 5/2013 | Tamaki | ........................ | 348/349 |
| 2014/0192249 A1* | 7/2014 | Kishi | ............................. | 348/349 |
| 2014/0320735 A1* | 10/2014 | Ikedo | ............................ | 348/350 |

FOREIGN PATENT DOCUMENTS

| | | |
|---|---|---|
| JP | 2001-83407 A | 3/2001 |
| JP | 2002-314062 A | 10/2002 |
| JP | 2009-010615 A | 1/2009 |

* cited by examiner

*Primary Examiner* — Timothy J Henn
(74) *Attorney, Agent, or Firm* — Carter, DeLuca, Farrell & Schmidt, LLP

(57) ABSTRACT

The image pickup apparatus includes an image sensor having plural pixels each being constituted by a microlens causing light fluxes from mutually different areas in an exit pupil of an image capturing optical system to form two object images and two photoelectric conversion portions photoelectrically converting the two object images, a signal reader performing a first reading operation that adds signals from the two photoelectric conversion portions to read the added signal as a pixel signal and a second reading operation that independently reads the signal from each of the two photoelectric conversion portions as the pixel signal, and a phase difference detector detecting a phase difference between the two object images by using the pixel signal read by the second reading operation. The signal reader performs, when the phase difference is detected, the second reading operation on pixel lines located discretely among plural pixel lines in the image sensor.

17 Claims, 7 Drawing Sheets

IMAGE PICKUP APPARATUS AND CONTROL METHOD THEREOF

BACKGROUND OF THE INVENTION

1. Field of the Invention

The present invention relates to an image pickup apparatus that performs focus detection using an image sensor by a phase difference detection method.

2. Description of the Related Art

The focus detection by the phase difference detection method detects a phase difference between paired object images formed by light fluxes from mutually different areas of an exit pupil of an image capturing optical system to detect a focus state of the image capturing optical system. Japanese Patent Laid-Open No. 2001-83407 discloses an image pickup apparatus that performs such focus detection by the phase difference detection method by using an image sensor photoelectrically converting an object image to produce image data. The image sensor used for this disclosed image pickup apparatus has, for each pixel, one microlens and two photoelectric conversion portions. The image pickup apparatus reads signals from the two photoelectric conversion portions separately (independently) from each other to obtain paired image signals corresponding to the paired object images, thereby enabling detection of a phase difference of the paired object images. Moreover, adding the signals read from the two photoelectric conversion portions enables production of the image data.

However, the image pickup apparatus disclosed in Japanese Patent Laid-Open No. 2001-83407 requires to read the signals for detecting the phase difference separately (independently) from the two photoelectric conversion portions in each pixel, which doubles a signal reading time for one pixel as compared with a case of reading the signal from one photoelectric conversion portion in each pixel.

SUMMARY OF THE INVENTION

The present invention provides an image pickup apparatus that detects the phase difference by using the image sensor and can suppress increase of the signal reading time from the image sensor.

The present invention provides as an aspect thereof an image pickup apparatus that includes an image sensor including plural pixels respectively arranged in a first direction and in a second direction, each pixel being constituted by a microlens causing light fluxes from mutually different areas in an exit pupil of an image capturing optical system to form two object images and two photoelectric conversion portions photoelectrically converting the two object images, a signal reader configured to perform a first reading operation that adds signals from the two photoelectric conversion portions to read the added signal as a pixel signal and a second reading operation that independently reads the signal from each of the two photoelectric conversion portions as the pixel signal, and a phase difference detector configured to detect a phase difference between the two object images by using the pixel signal read by the second reading operation. The image sensor includes plural pixel lines arranged in the first direction, each pixel line including pixels lined in the second direction. The signal reader performs, when the phase difference detector detects the phase difference, the second reading operation on the pixel lines located discretely in the first direction among the plural pixel lines.

The present invention provides as another aspect thereof an image pickup apparatus that includes an image sensor including plural pixels, each pixel being constituted by a microlens causing light fluxes from mutually different areas in an exit pupil of an image capturing optical system to form two object images and two photoelectric conversion portions photoelectrically converting the two object images, a signal reader configured to perform a first reading operation that adds signals from the two photoelectric conversion portions to read the added signal as a pixel signal and a second reading operation that independently reads the signal from each of the two photoelectric conversion portions as the pixel signal, and a phase difference detector configured to detect a phase difference between the two object images by using the pixel signal read by the second reading operation. The signal reader performs, when the phase difference detector detects the phase difference, the second reading operation only on the pixels arranged at a predetermined arrangement cycle among the plural pixels.

The present invention provides as still another aspect thereof a method of controlling an image pickup apparatus that includes an image sensor including plural pixels respectively arranged in a first direction and in a second direction, each pixel being constituted by a microlens causing light fluxes from mutually different areas in an exit pupil of an image capturing optical system to form two object images and two photoelectric conversion portions photoelectrically converting the two object images, the image sensor including plural pixel lines arranged in the first direction and each pixel line including pixels lined in the second direction. The method includes a signal reading step of performing a first reading operation that adds signals from the two photoelectric conversion portions to read the added signal as a pixel signal and a second reading operation that independently reads the signal from each of the two photoelectric conversion portions as the pixel signal, and a phase difference detecting step of detecting a phase difference between the two object images by using the pixel signal read by the second reading operation. The signal reading step performs, when the phase difference detecting step detects the phase difference, the second reading operation on the pixel lines located discretely in the first direction among the plural pixel lines.

The present invention provides as yet still another aspect thereof a method of controlling an image pickup apparatus that includes an image sensor including plural pixels, each pixel being constituted by a microlens causing light fluxes from mutually different areas in an exit pupil of an image capturing optical system to form two object images and two photoelectric conversion portions photoelectrically converting the two object images. The method includes a signal reading step of performing a first reading operation that adds signals from the two photoelectric conversion portions to read the added signal as a pixel signal and a second reading operation that independently reads the signal from each of the two photoelectric conversion portions as the pixel signal, and a phase difference detecting step of detecting a phase difference between the two object images by using the pixel signal read by the second reading operation. The signal reading step performs, when the phase difference detecting step detects the phase difference, the second reading operation only on the pixels arranged at a predetermined arrangement cycle among the plural pixels.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
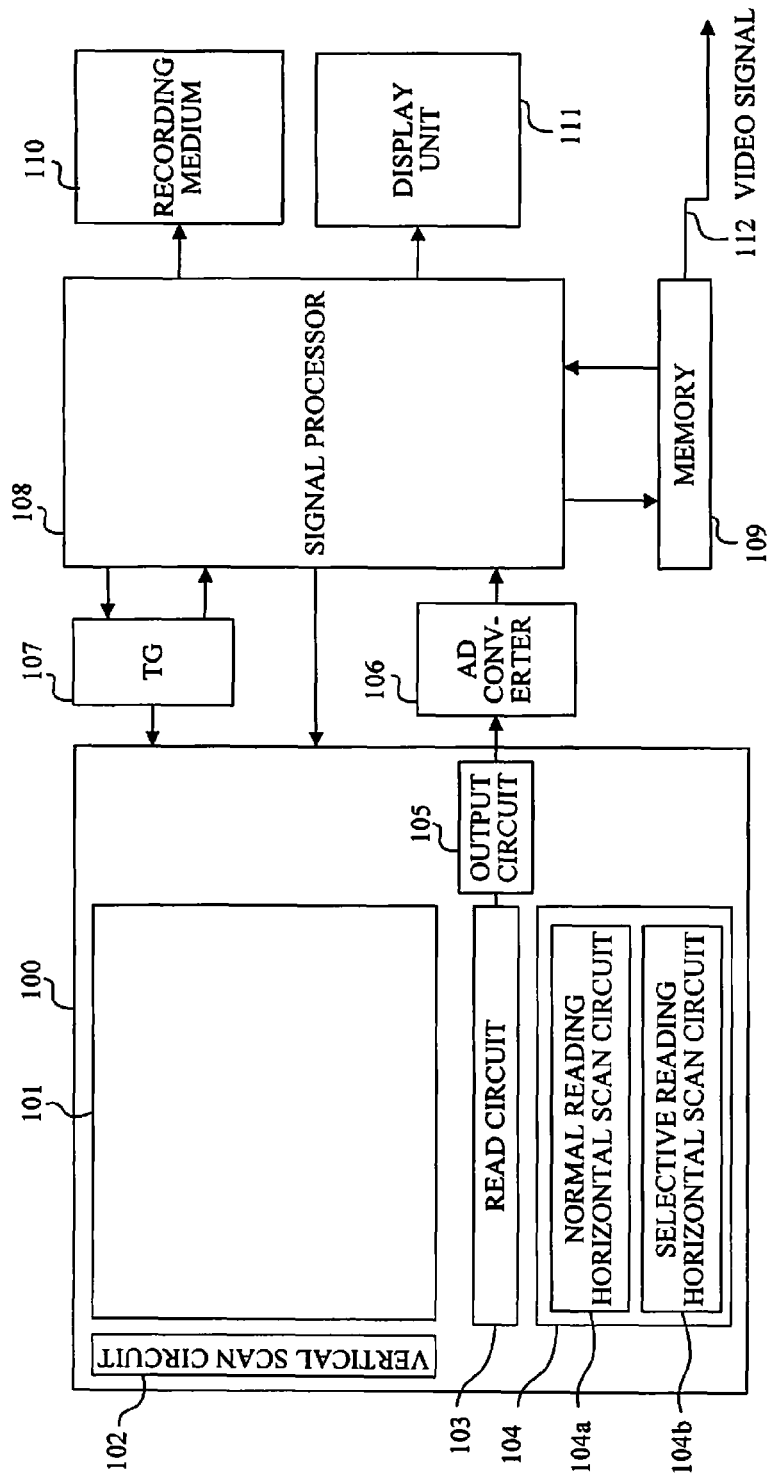
FIG. 1 is a block diagram showing a configuration of an image capturing part in an image pickup apparatus that is Embodiment 1 of the present invention.

FIG. 1 shows a configuration of a digital camera as an image pickup apparatus that is a first embodiment (Embodiment 1) of the present invention. This image pickup apparatus is provided with an interchangeable or integrally-installed image capturing optical system (not shown).

An image sensor 100 is a photoelectric conversion element that photoelectrically converts an object image formed by the image capturing optical system. The image sensor 100 includes a pixel part 101 in which plural pixels are two-dimensionally arranged so as to form plural horizontal pixel lines×plural vertical pixel columns. In this embodiment, the horizontal direction corresponds to a first direction, and the vertical direction corresponds to a second direction. As described later, each of the pixels includes two photoelectric conversion portions. Moreover, the image sensor 100 includes a vertical scan circuit 102 that selects one of the pixel lines in the pixel part 101 and a horizontal scan circuit 104 that selects one of the pixel columns in the pixel part 101. The image sensor 100 further includes a read circuit 103 that reads a signal (pixel signal) from each of the pixels included in the pixel line selected by the vertical scan circuit 102 and an output circuit 105 that outputs the pixel signals read by the read circuit 103 to an outside of the image sensor 100.

The horizontal scan circuit 104 includes a normal reading horizontal scan circuit 104a and a selective reading horizontal scan circuit 104b, and switches using one of these circuits 104a and 104b depending on an addition reading operation and an independent reading operation, which are described later. The output circuit 105 includes a gain amplifier that amplifies the pixel signal output from the read circuit 103 and others.

A timing generator (TG) 107 produces a control signal to drive the image sensor 100. The TG 107 controls drive of the image sensor 100 in response to a control command from a signal processor 108, and supplies a reference clock to the signal processor 108. The pixel signal (analog signal) output from the image sensor 100 (that is, from the output circuit 105) is converted into a digital signal by an AD converter 106 to be transferred to the signal processor 108.

The signal processor 108 is connected with an external memory 109 and performs signal processing by using this external memory 109 to produce a captured image signal. The captured image signal produced by the signal processor 108 is written to a recording medium 110, is output to a display unit 111 as a still image or a moving image, or is output after conversion to a video signal from a video output terminal 112. Moreover, the signal processor 108 is connected with the image sensor 100 to send thereto a control signal for controlling drive of the image sensor 100.

In addition, the signal processor 108 performs focus detection of the image capturing optical system, that is, detection of a phase difference (described later) by using signals read from the image sensor 100, and performs focus control of the image capturing optical system (that is, drive control of a focus lens included in the image capturing optical system) based on the phase difference. The signal processor 108 constitutes, together with the horizontal scan circuit 104 (normal and selective reading horizontal scan circuits 104a and 104b), a signal reader. The signal processor 108 corresponds to a phase difference detector and a focus controller.

Figure 2:
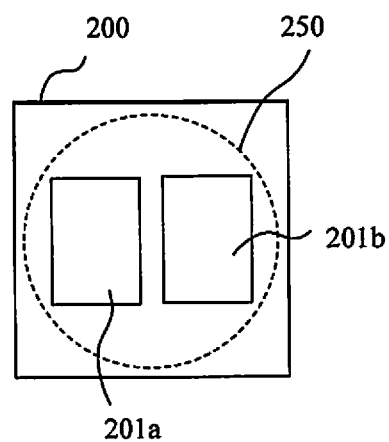
FIG. 2 shows a structure of a pixel of an image sensor to be used in the image pickup apparatus.

FIG. 2 shows one pixel 200 in the image sensor 100. The pixel 200 includes one microlens 250 and two photoelectric conversion portions (a first photoelectric conversion portion and a second photoelectric conversion portion) 201a and 201b. The microlens 250 introduces light fluxes from mutually different areas in an exit pupil of the image capturing optical system to the first photoelectric conversion portion 201a and the second photoelectric conversion portion 201b.

On the pixels 200, two (paired) object images are formed by the light fluxes from the mutually different areas in the exit pupil of the image capturing optical system. Signals read from the first photoelectric conversion portions 201a of the respective pixels 200 are used to produce an image signal corresponding to one of the paired object images, and signals read from the second photoelectric conversion portions 201b of the respective pixels 200 are used to produce an image signal corresponding to the other one of the paired object images. The paired image signals are read by the signal processor 108.

Figure 3:
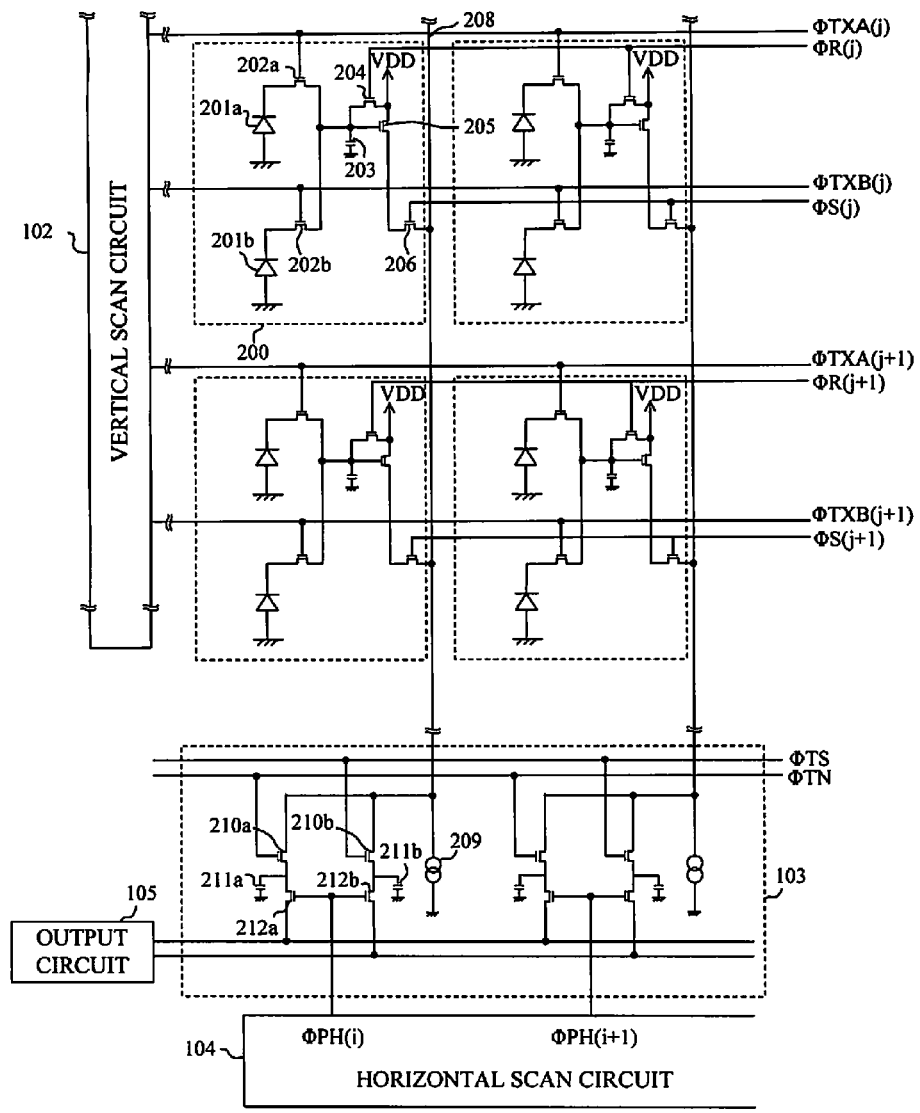
FIG. 3 shows an electrical circuit of the image sensor.

FIG. 3 shows pixels included in two pixel lines (a j-th pixel line and a j+1-th pixel line)×two pixel columns (an i-th pixel column and an i+1-th pixel column) in the pixel part 101 of the image sensor 100. The pixel part 101 includes, for example, 1920 pixel lines×1080 pixel columns. The following description is made of the pixels included in the j-th pixel line as an example.

Each pixel 200 is provided with the first and second photoelectric conversion portions 201a and 201b, transfer switches 202a and 202b, a floating diffusion (FD) area 203 and a reset switch 204. Each pixel 200 is further provided with a source follower amplifier 205 and a line selection switch 206.

A gate of the transfer switch 202a is connected with a control signal ΦTXA(j), and a gate of the transfer switch 202b is connected with a control signal ΦTXB(j). The reset switch 204 is connected with a reset signal ΦR(j). Moreover, a gate of the line selection switch 206 is connected with a line selection signal ΦS(j) from the vertical scan circuit 102. The control signals ΦTXA(j) and ΦTXB(j), the reset signal ΦR(j) and the line selection signal ΦS(j) are connected with the pixels in the i-th pixel line. Similarly, control signals ΦTXA(j+1) and ΦTXB(j+1), a reset signal ΦR(j+1) and a line selection signal ΦS(j+1) are connected with the pixels in the j+1-th pixel line.

Moreover, a vertical signal line 208 is provided for each pixel line. The vertical signal line 208 is connected with a load current source 209 and transfer switches 210a and 210b in the read circuit 103.

A gate of the transfer switch 210a is connected with a control signal ΦTN, and a gate of the transfer switch 210b is connected with a control signal ΦTS. A gate of a transfer switch 212a and a gate of a transfer switch 212b are connected with a line selection signal ΦPH(i) output from the horizontal scan circuit 104.

An accumulation capacitor 211a is capable of accumulating output of the vertical signal line 208 when the transfer switch 210a is turned on and the transfer switch 212a is turned off. Similarly, an accumulating capacitor 211b is capable of accumulating the output of the vertical signal line 208 when the transfer switch 210b is turned on and the transfer switch 212b is turned off.

Turning-on of the transfer switches 212a and 212b for the i-th pixel line by the line selection signal ΦPH(i) from the horizontal scan circuit 104 causes the accumulation capacitors 211a and 211b to transfer output therefrom to the output circuit 105 through two separate horizontal output lines.

The signal processor 108 switches a signal reading operation from the image sensor 100 thus structured between an addition reading operation that is a first reading operation and an independent reading operation that is a second reading operation.

Figure 4:
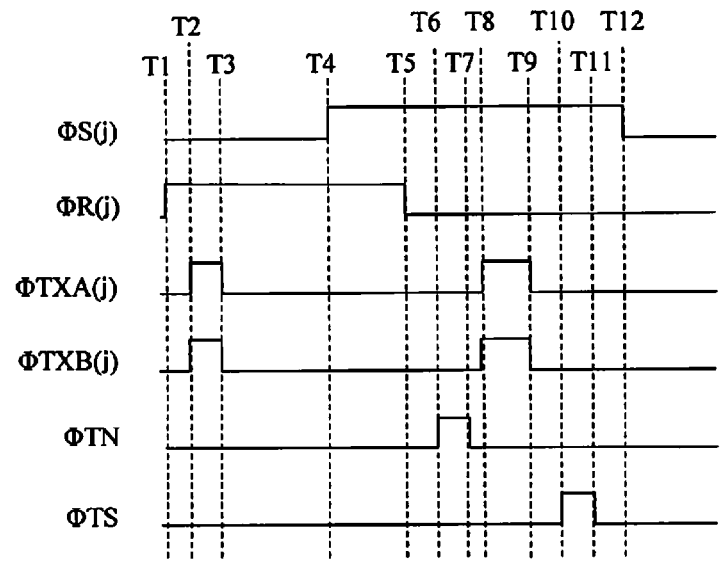
FIG. 4 shows timings of an addition reading operation of the image sensor.

First, description of the addition reading operation will be made with reference to FIG. 4. FIG. 4 shows operation timings for the j-th pixel line of the image sensor 100 in the addition reading operation. At a time T1, the reset signal ΦR(j) is activated. Next, at a time T2, in response to the control signals ΦTXA(j) and ΦTXB(j) are activated, the first and second photoelectric conversion portions 201a and 201b of each pixel in the j-th pixel line are reset.

Next, at a time T3, in response to negation of the control signals ΦTXA(j) and ΦTXB(j), the first and second photoelectric conversion portions 201a and 201b start their charge accumulation.

Next, at a time T4, in response to activation of the line selection signal ΦS(j), the line selection switch 206 is turned on and thereby is connected with the vertical signal line 208. Thus, the source follower amplifier 205 is activated.

Next, at a time T5, the reset signal ΦR(j) is negated. Then, at a time T6, in response to activation of the control signal ΦTN, the transfer switch 210a is turned on, and a signal output after the reset is released is output to the vertical signal line 208 to appear in the accumulation capacitor 211a.

Next, at a time T7, the control signal ΦTN is negated, and then the appeared signal output is held in the accumulation signal capacitor 211a. Thereafter, at a time T8, in response to activation of the control signals ΦTXA(j) and ΦTXB(j), charges of the first and second photoelectric conversion portions 201a and 201b are transferred to the FD area 203. The transfer of the charges of the two the photoelectric conversion portions 201a and 201b to the same FD area 203 enables output of a signal produced by adding the charges of the two photoelectric conversion portions 201a and 201b to the vertical signal line 208.

Next, at a time T9, the control signals ΦTXA(j) and ΦTXB(j) are negated. Then, at a time T10, in response to activation of the control signal ΦTS, the transfer switch 210b is turned on and thereby a signal output appears in the accumulation capacitor 211b.

Next, at a time T11, the control signal ΦTS is negated and this appeared signal output is held in the accumulation capacitor 211b. Then, at a time T12, the line selection signal ΦS(j) is negated.

Thereafter, according to the line selection signal ΦPH(i) from the horizontal scan circuit 104, the transfer switches 209a and 209b are sequentially activated, and thereby the signals from the accumulation capacitors 211a and 211b are transferred to the output circuit 105 through the two separate horizontal output lines.

The output circuit 105 calculates a difference between these two horizontal output lines, and multiplies the difference by a predetermined gain to produce a signal and outputs it to the AD converter 106. The signal processor 108 produces an image by using this signal.

Figure 5:
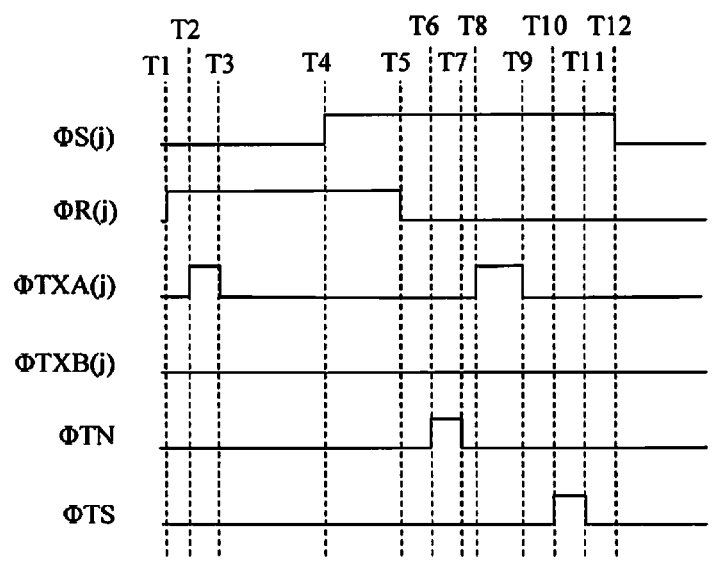
FIG. 5 shows timings of an independent reading operation of the image sensor.

Next, description of the independent reading operation will be made with reference to FIG. 5. FIG. 5 shows operation timings for the j-th pixel line of the image sensor 100 in the independent reading operation. At a time T1, the reset signal ΦR(j) is activated. Next, at a time T2, in response to the control signal ΦTXA(j) is activated, the first photoelectric conversion portion 201a of each pixel in the j-th pixel line is reset.

Next, at a time T3, in response to negation of the control signals ΦTXA(j), the first photoelectric conversion portion 201a starts its charge accumulation.

Next, at a time T4, in response to activation of the line selection signal ΦS(j), the line selection switch 206 is turned on and thereby is connected with the vertical signal line 208. Thus, the source follower amplifier 205 is activated.

Next, at a time T5, the reset signal ΦR(j) is negated. Then, at a time T6, in response to activation of the control signal ΦTN, the transfer switch 210a is turned on, and a signal output after the reset is released is output to the vertical signal line 208 to appear in the accumulation capacitor 211a.

Next, at a time T7, the control signal ΦTN is negated. Then, at s time T8, in response to activation of the control signal ΦTXA(j), a charge of the first photoelectric conversion portion 201a is transferred to the FD area 203. Since the charge of one of the two photoelectric conversion portions 201a and 201b (in this embodiment, the charge of the first photoelectric conversion portion 201a) is transferred to the FD area 203, a signal corresponding only to the charge of the one photoelectric conversion portion (201a) is independently output to the vertical signal line 208.

Next, at a time T9, the control signal ΦTXA(j) is negated. Then, at a time T10, in response to activation of the control signal ΦTS, the transfer switch 210b is turned on and thereby a signal output appears in the accumulation capacitor 211b.

Next, at a time T11, the control signal ΦTS is negated. Then, at a time T12, the line selection signal ΦS(j) is negated.

Thereafter, according to the line selection signal ΦPH(i) from the horizontal scan circuit 104, the transfer switches 209a and 209b are sequentially activated, and thereby the signals from the accumulation capacitors 211a and 211b are transferred to the output circuit 105 through the two separate horizontal output lines.

Although this description is made of the operation of the image sensor 100 for independently reading the output of the first photoelectric conversion portion 201a, the output of the second photoelectric conversion portion 201b may be independently read. In this case, it is only necessary to replace the control signal ΦTXA(j) in FIG. 5 by the control signal ΦTXB(j).

Moreover, after reading the signal from the first photoelectric conversion portion 201a in the selected pixel line, the horizontal scan circuit 104 scans the first pixel line again. In this scanning, the signal from the second photoelectric conversion portion 201b is read. Thereby, independent reading of the signals from the two photoelectric conversion portions 201a and 201b for one charge accumulation operation can be performed.

Thus, the independent signal reading from the two photoelectric conversion portions 201a and 201b provided in each of the plural pixels 200 in the image sensor 100 is performed. With such independent signal reading, the image processor 108 can acquire the paired image signals corresponding to the paired object images, and can detect (calculate) the phase difference between these paired image signals (that is, between the paired object images) by performing correlation calculation on the paired image signals.

In order to detect the phase difference, it is necessary to perform the independent reading operation on the respective first and second photoelectric conversion portions 201a and 201b. However, performing the independent reading operation on the two photoelectric conversion portions 201a and 201b requires a time about twice that for the addition reading operation, which makes a time required for the phase difference detection long.

Thus, this embodiment employs, when performing the independent reading operation, a selective reading method (as one of image sensor driving methods) which reads only from pixels (pixel lines) arranged at an n-line cycle in the pixel part 101, thereby shortening the time required for the phase difference detection. This selective reading performed on the pixel lines arranged at the n-line cycle is an example, and selective reading may be performed on pixel lines located discretely in a pixel line arrangement direction (horizontal direction in this embodiment).

In FIG. 1, the control signal from the TG 107 switches the signal read circuit that actually performs the signal reading operation between the normal reading horizontal scan circuit 104a and the selective reading horizontal scan circuit 104b which are included in the horizontal scan circuit 104. Such switching of the signal read circuit may be performed not only by the control signal from the TG 107, but also by a signal from a controller outside the image sensor 100, such as the signal processor 108.

The normal reading horizontal scan circuit 104a produces the line selection signal for sequentially selecting the pixel line one by one from a first pixel line to a final pixel line in the pixel part 101. Specifically, the normal reading horizontal scan circuit 104a is constituted by a shift register that has bits corresponding to an image width. This shift resister produces, in response to input of a start bit and input of a clock signal from the TG 107, the line selection signal for sequentially selecting the pixel line one by one.

On the other hand, the selective reading horizontal scan circuit 104b produces the line selection signal for selecting pixel lines arranged at the n-line cycle (predetermined arrangement cycle) from a specific starting pixel line. When defining the starting pixel line as an m-line, the TG 107 controls the selective reading horizontal scan circuit 104b such that m is changed from 0 to n−1. The selective reading horizontal scan circuit 104b is constituted by a shift register that has bits corresponding to the image width and a switch group that switches connection and disconnection of bypass lines bypassing the bits of the shift register, and produces, according to control pulses from the TG 107, the line selection signal for selecting the pixel lines at the n-line cycle. Such a selective reading horizontal scan circuit 104b can be easily realized by sharing the shift register with the normal reading horizontal scan circuit 104a and by providing a transistor switch to each pixel line.

A mode performing the phase difference detection by using the selective reading horizontal scan circuit 104b is hereinafter referred to as "a first phase difference detection mode".

Figure 6:
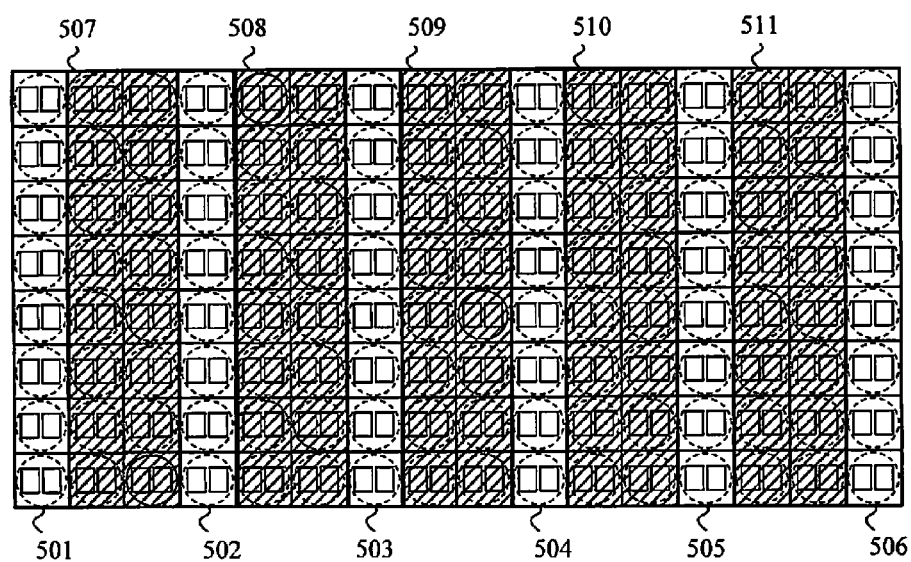
FIG. 6 shows pixels on which the independent reading operation is performed in a first phase difference detection mode in the image pickup apparatus.

FIG. 6 shows an example of pixels on which the independent reading operation is performed in the first phase difference detection mode. In FIG. 6, pixel lines 501 to 506 arranged at a three-line cycle are selected by the selective reading horizontal scan circuit 104b. In the first phase difference detection mode, the independent reading operation is performed only on these selected pixel lines 501 to 506 without being performed on other pixel lines 507 to 511.

In this case, even though the independent reading operation is performed twice on each pixel (that is, on the first and second photoelectric conversion portions 201a and 201b) for the phase difference detection, a total time required for this reading is ⅔ of the time required when the addition reading operation is performed. This reading time enables acquisition of the paired image signals for the phase difference detection from the entire pixel part 101 (however, the pixel lines arranged at the three-line cycle) in a short time.

As described above, this embodiment performs the independent reading operation only on the selected pixels arranged at the predetermined arrangement cycle, which enables performing of the independent reading operation in the entire pixel part 101 (however, the pixels arranged at the predetermined arrangement cycle) in a time of 2/n of the time required when the addition reading operation is performed.

Embodiment 2

Next, description will be made of a second embodiment (Embodiment 2) of the present invention. This embodiment performs, as well as Embodiment 1, the independent reading operation with selection of the pixel lines arranged at the n-line cycle by the selective reading method. However, this embodiment shifts the starting pixel line at each frame during moving image capturing (each frame corresponds to an image producing cycle in the moving image capturing), which increases number of the pixel lines as compared with a case of fixing the starting pixel line. An image pickup apparatus has the same configuration as that of the image pickup apparatus 100 of Embodiment 1.

In this embodiment, the selective reading horizontal scan circuit 104b sequentially changes m from 0 to n−1 at each frame according to the control pulse from the TG 107, which repeatedly shifts the starting pixel line one by one at an n-frame cycle.

This embodiment changes in plural frames the pixel lines on which the independent reading operation is performed, thereby enabling production of the paired images by using more number of the pixel lines than the case of fixing the pixel lines on which the independent reading operation is performed. Accordingly, this embodiment enables acquisition of image signals with higher resolution, which makes it possible to further improve accuracy of the phase difference detection.

Embodiment 3

Next, description will be made of a third embodiment (Embodiment 3) of the present invention. This embodiment includes, in addition to the first phase difference detection mode described in Embodiments 1 and 2, a second phase difference detection mode which performs the independent reading operation on a partial area (hereinafter referred to as "a reading block") of the pixel part 101.

Figure 7:
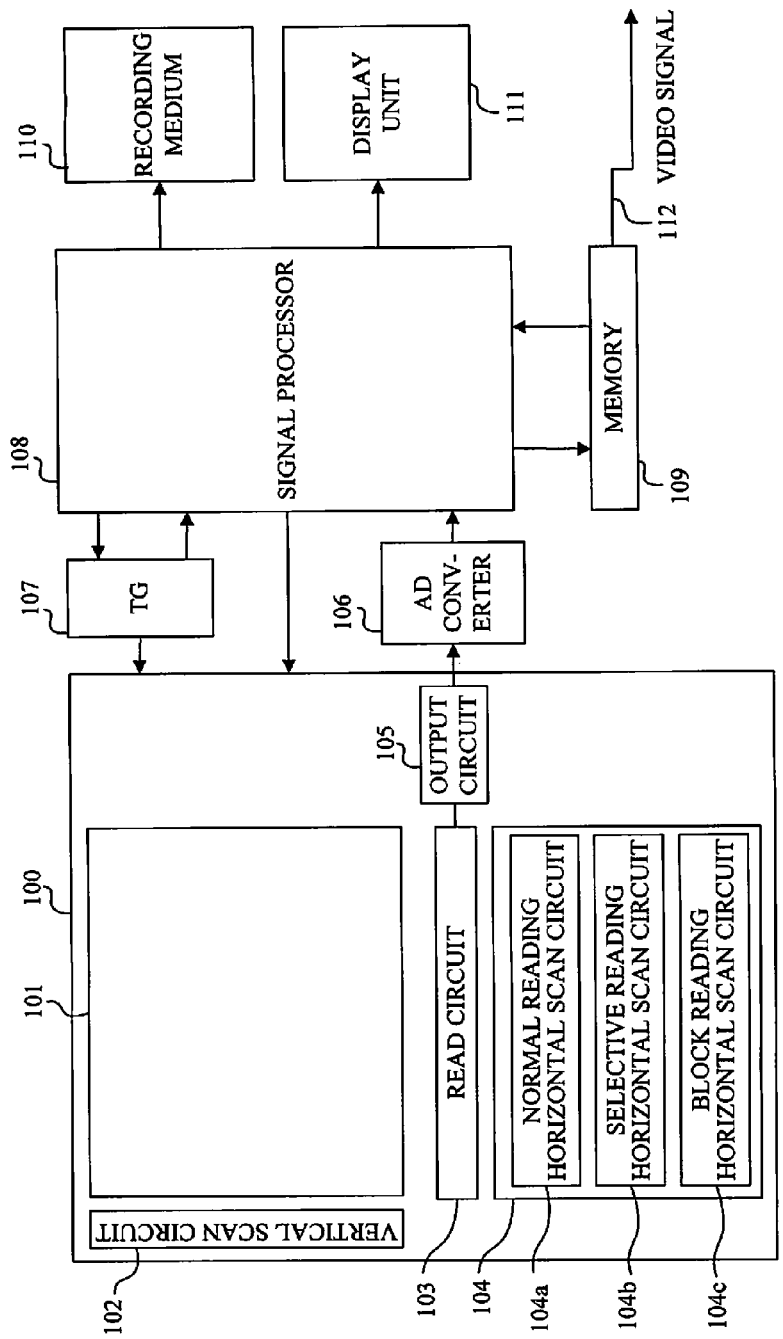
FIG. 7 is a block diagram showing a configuration of an image capturing part of an image pickup apparatus that is Embodiment 3 of the present invention.

FIG. 7 shows a configuration of an image pickup apparatus of this embodiment. The image pickup apparatus includes a block reading horizontal scan circuit 104c, and has the same configuration (except the block reading horizontal scan circuit 104c) as that of the image pickup apparatus of Embodiment 1 (or Embodiment 2) shown in FIG. 1.

The block reading horizontal scan circuit 104c specifies, according to a control signal from the TG 107, an area of the pixel lines as the reading block on which the independent reading operation is performed. The control signal from the TG 107 corresponds to a signal produced by adding a signal for specifying the reading block to the control pulse (described in Embodiments 1 and 2) output from the TG 107.

Figure 8:
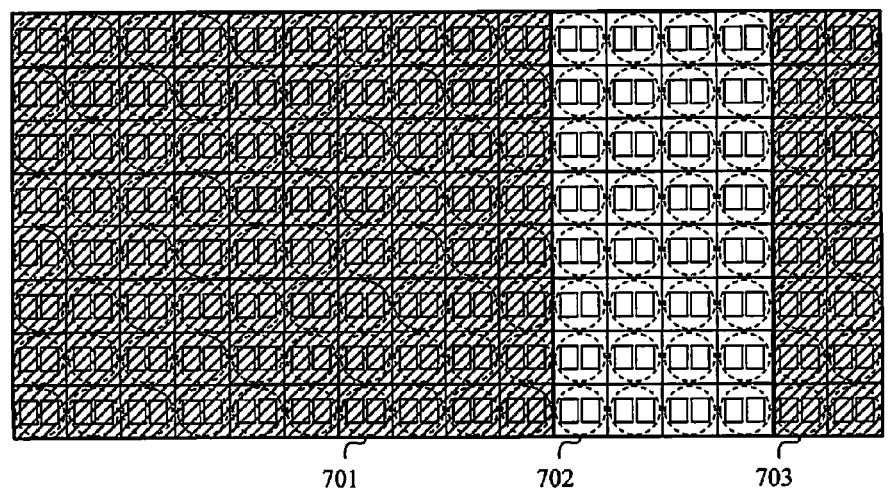
FIG. 8 shows pixels on which an independent reading operation is performed in a second phase difference detection mode in the image pickup apparatus of Embodiment 3.

FIG. 8 shows an example of pixels on which the independent reading operation is performed in the second phase difference detection mode. As shown in FIG. 8, the independent reading operation is performed on all pixel lines included in the reading block 702 of the pixel part 101, and any signal reading operation is not performed on the pixels included in other areas 701 and 703. Performing the independent reading operation only on the reading block 702 makes it possible to provide the image signals required for the phase difference detection while suppressing increase of number of pixels on which the independent reading operation is performed. The reading block 702 may be selected by a user arbitrarily or by the signal processor 108 according to an algorithm which will be described later.

This embodiment can select the pixels on which the independent reading operation is performed more densely (that is, at a smaller arrangement cycle) than the case described in Embodiments 1 and 2 where the independent reading operation is performed on the pixel lines arranged at the n-line cycle in the entire pixel part 101 while keeping the time required for the independent reading operation approximately the same. Such a denser selection of the pixels on which the independent reading operation is performed enables acquisition of image signals with high resolution, which makes it possible to improve accuracy of the phase difference detection.

Next, description will be made of switching of the phase difference detection mode between the first phase difference detection mode and the second phase difference detection mode (that is, description of the selecting algorithm of the second phase difference detection mode will be made). This switching is controlled by the signal processor 108.

After starting an operation for the phase difference detection, the signal processor 108 sets the first phase difference detection mode to perform the independent reading operation on the pixels arranged at the n-line cycle, and thereby acquires the paired image signals from the entire pixel part 101. The signal processor 108 enters, when acquiring information on a predetermined focus state of the image capturing optical system such as a pixel line where a minimum defocus amount is predicted from the phase difference between the paired image signals, into the second phase difference detection mode.

Then, in the second phase difference detection mode, the signal processor 108 selects the reading block including the pixel line where the minimum defocus amount is predicted, and performs the independent reading operation on all the pixel lines in the reading block. The signal processor 108 acquires, through this reading operation, more detailed paired image signals, and detects the phase difference therebetween.

Capturing the object images by the entire pixel part 101 in the first phase difference detection mode makes it easy to find a position on which focusing is targeted when change of position of the image pickup apparatus rapidly moves the object image formed on the pixel part 101 or when focusing control is performed on a moving object.

Furthermore, use of the second phase difference detection mode enabling higher accurate phase difference detection than the first phase difference detection mode makes it possible to provide high in-focus accuracy.

In the second phase difference detection mode, the independent reading operation may be performed, not on all the pixel lines included in the reading block, but on the pixel lines arranged at a smaller line cycle than the n-line cycle. Such an independent reading operation also enables provision of similar effects to those described in this embodiment.

The focusing control (drive control of the focus lens) based on the phase difference detected in the first phase difference detection mode may be performed or not performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-206789, filed on Sep. 22, 2011, which is hereby incorporated by reference herein in its entirety.

What is claimed is:
1. An image pickup apparatus comprising:
an image sensor including plural pixels respectively arranged in a first direction and in a second direction, each pixel being constituted by (a) a microlens and (b) two photoelectric conversion portions respectively photoelectrically converting two object images formed by the microlens;
a signal reader configured to perform a first reading operation that adds signals from the two photoelectric conversion portions to read the added signal as a pixel signal and a second reading operation that independently reads the signal from each of the two photoelectric conversion portions as the pixel signal; and
a phase difference detector configured to detect a phase difference between the two object images by using the pixel signal read by the second reading operation,
wherein the image sensor includes plural pixel lines arranged in the first direction, each pixel line including pixels lined in the second direction, and
wherein the signal reader performs, when the phase difference detector detects the phase difference, the second reading operation on the pixel lines located discretely in the first direction among the plural pixel lines, and
wherein the signal reader changes a starting pixel line from which the second reading operation is started, at an image producing cycle in moving image capturing.

2. The image pickup apparatus according to claim 1, wherein the signal reader performs, when the phase difference detector detects the phase difference, the second reading operation on the pixel lines arranged at a predetermined arrangement cycle among the plural pixel lines.

3. The image pickup apparatus according to claim 1, wherein the signal reader performs the first reading operation on the pixel lines on which the signal reader performs the second reading operation.

4. The image pickup apparatus according to claim 1, wherein the signal reader performs the first reading operation on the pixel lines including at least one pixel line on which the signal reader does not perform the second reading operation.

5. An image pickup apparatus according to claim 1, wherein the signal reader switches its phase difference detection mode between a first phase difference detection mode to perform the second reading operation on the pixel lines arranged at a predetermined arrangement cycle among the plural pixel lines and a second phase difference detection mode to perform the second reading operation on pixel lines selected from the plural pixel lines, the selected pixel lines being all pixel lines included in a selected partial area among the plural pixel lines or being pixel lines arranged at an arrangement cycle smaller than the predetermined arrangement cycle in the selected partial area.

6. The image pickup apparatus according to claim 5, wherein the signal reader selects, based on information on a focus state of the image capturing optical system obtained through the second reading operation in the first phase difference detection mode, the partial area on which the signal reader performs the second reading operation in the second phase difference detection mode.

7. The image pickup apparatus according to claim 1, wherein the two photoelectric conversion portions respectively photoelectrically convert the two object images, wherein the two object images are formed by the microlens from light fluxes through mutually different areas in an exit pupil of an image capturing optical system.

8. A method of controlling an image pickup apparatus including an image sensor including plural pixels respectively arranged in a first direction and in a second direction, each pixel being constituted by (a) a microlens causing light fluxes from mutually different areas in an exit pupil of an image capturing optical system to form two object images and (b) two photoelectric conversion portions photoelectrically converting the two object images, the image sensor including plural pixel lines arranged in the first direction and each pixel line including pixels lined in the second direction, the method comprising:
performing a first reading operation that adds signals from the two photoelectric conversion portions to read the added signal as a pixel signal and a second reading operation that independently reads the signal from each of the two photoelectric conversion portions as the pixel signal;
changing a starting pixel line from which the second reading operation is started, at an image producing cycle in moving image capturing; and
detecting a phase difference between the two object images by using the pixel signal read by the second reading operation, wherein the performing step performs, when the detecting step detects the phase difference, the second reading operation on the pixel lines located discretely in the first direction among the plural pixel lines.

9. An image pickup apparatus comprising:
an image sensor including plural pixels respectively arranged in a first direction and in a second direction, each pixel being constituted by (a) a microlens and (b) two photoelectric conversion portions respectively photoelectrically converting two object images formed by the microlens;
a signal reader configured to perform a first reading operation that adds signals from the two photoelectric conversion portions to read the added signal as a pixel signal and a second reading operation that independently reads the signal from each of the two photoelectric conversion portions as the pixel signal; and
a phase difference detector configured to detect a phase difference between the two object images by using the pixel signal read by the second reading operation,
wherein the image sensor includes plural pixel lines arranged in the first direction, each pixel line including pixels lined in the second direction, and
wherein the signal reader switches its phase difference detection mode between a first phase difference detection mode to perform the second reading operation on first pixel lines located discretely in the first direction among the plural pixel lines in a predetermined area and a second phase difference detection mode to perform the second reading operation on second pixel lines located more densely than the first pixel lines in a part of the predetermined area.

10. The image pickup apparatus according to claim 9, wherein the signal reader performs, when the phase difference detector detects the phase difference, the second reading operation on the pixel lines arranged at a predetermined arrangement cycle among the plural pixel lines.

11. The image pickup apparatus according to claim 9, wherein the signal reader performs the first reading operation on the pixel lines on which the signal reader performs the second reading operation.

12. The image pickup apparatus according to claim 9, wherein the signal reader performs the first reading operation on the pixel lines including at least one pixel line on which the signal reader does not perform the second reading operation.

13. The image pickup apparatus according to claim 9, wherein the signal reader selects, based on information on a focus state of the image capturing optical system obtained through the second reading operation in the first phase difference detection mode, the partial area on which the signal reader performs the second reading operation in the second phase difference detection mode.

14. The image pickup apparatus according to claim 9, wherein the two photoelectric conversion portions respectively photoelectrically convert the two object images, wherein the two object images are formed by the microlens from light fluxes through mutually different areas in an exit pupil of an image capturing optical system.

15. The image pickup apparatus according to claim 9, wherein the signal reader switches its phase difference detection mode between a first phase difference detection mode to perform the second reading operation on the pixel lines located discretely in the first direction among the plural pixel lines on the pixel lines arranged at a predetermined arrangement cycle among the plural pixel lines and a second phase difference detection mode to perform the second reading operation on pixel lines selected from the plural pixel lines, the selected pixel lines being all pixel lines included in a selected partial area among the plural pixel lines or being pixel lines arranged at an arrangement cycle smaller than the predetermined arrangement cycle in the selected partial area.

16. The image pickup apparatus according to claim 9, wherein the second phase difference detection mode is a mode to perform the second reading operation on pixel lines selected from the plural pixel lines, the selected pixel lines being all pixel lines included in a selected partial area among the plural pixel lines.

17. A method of controlling an image pickup apparatus including an image sensor including plural pixels respectively arranged in a first direction and in a second direction, each pixel being constituted by (a) a microlens causing light fluxes from mutually different areas in an exit pupil of an image capturing optical system to form two object images and (b) two photoelectric conversion portions photoelectrically converting the two object images, the image sensor including plural pixel lines arranged in the first direction and each pixel line including pixels lined in the second direction, the method comprising:
performing a first reading operation that adds signals from the two photoelectric conversion portions to read the added signal as a pixel signal and a second reading operation that independently reads the signal from each of the two photoelectric conversion portions as the pixel signal;
detecting a phase difference between the two object images by using the pixel signal read by the second reading operation; and
switching a phase difference detection mode between a first phase difference detection mode to perform the second reading operation on first pixel lines located discretely in the first direction among the plural pixel lines in a predetermined area and a second phase difference detection mode to perform the second reading operation on second pixel lines located more densely than the first pixel lines in a part of the predetermined area.

* * * * *